(12) United States Patent
Lim

(10) Patent No.: US 11,250,714 B2
(45) Date of Patent: Feb. 15, 2022

(54) METHOD AND SYSTEM FOR PROVIDING COOKING SUPPORT SERVICES

(71) Applicants: NHN Entertainment Corporation, Seongnam-si (KR); NHN Studio629 Corporation, Seongnam-si (KR)

(72) Inventor: Chuljae Lim, Seongnam-si (KR)

(73) Assignees: NHN Entertainment Corporation, Seongnam-si (KR); NHN Studio629 Corporation, Seongnam-si (KR)

( * ) Notice: Subject to any disclaimer, the term of this patent is extended or adjusted under 35 U.S.C. 154(b) by 410 days.

(21) Appl. No.: 15/696,538

(22) Filed: Sep. 6, 2017

(65) Prior Publication Data
US 2018/0082603 A1 Mar. 22, 2018

(30) Foreign Application Priority Data
Sep. 21, 2016 (KR) .................. 10-2016-0120557

(51) Int. Cl.
| | |
|---|---|
| *G09B 5/06* | (2006.01) |
| *G09B 19/00* | (2006.01) |
| *G06Q 30/02* | (2012.01) |
| *G06F 3/0482* | (2013.01) |
| *G06F 16/9038* | (2019.01) |
| *G06F 16/9535* | (2019.01) |

(52) U.S. Cl.
CPC ......... *G09B 5/065* (2013.01); *G06F 16/9038* (2019.01); *G06F 16/9535* (2019.01); *G09B 5/06* (2013.01); *G09B 19/00* (2013.01); *G06F 3/0482* (2013.01); *G06Q 30/02* (2013.01)

(58) Field of Classification Search
CPC ...... G06Q 30/02; G06F 3/0482; G09B 19/00; G09B 5/06; G09B 5/065
See application file for complete search history.

(56) References Cited

U.S. PATENT DOCUMENTS

| | | | |
|---|---|---|---|
| 9,832,821 B2 | 11/2017 | Unagami et al. | |
| 10,025,282 B1* | 7/2018 | Wilkinson | H04L 67/141 |
| 2002/0045959 A1* | 4/2002 | Van Overveld | G06Q 30/02 700/90 |
| 2003/0141295 A1 | 7/2003 | Ishikawa et al. | |

(Continued)

FOREIGN PATENT DOCUMENTS

| | | |
|---|---|---|
| JP | 8-242779 | 9/1996 |
| JP | 2002-168453 | 6/2002 |

(Continued)

OTHER PUBLICATIONS

Notification of Reasons for Refusal dated Aug. 7, 2018, issued in the Japanese Patent Application No. 2017-174723.

(Continued)

*Primary Examiner* — Jerry-Daryl Fletcher
(74) *Attorney, Agent, or Firm* — H.C. Park & Associates, PLC

(57) ABSTRACT

A method and system for providing a cooking support service. A computer-implemented method may include receiving a selection on a specific recipe from a user of an electronic device among recipes registered on a platform; and providing specifications information about each piece of cookware included in the specific recipe.

8 Claims, 5 Drawing Sheets

(56) References Cited

U.S. PATENT DOCUMENTS

| | | | | |
|---|---|---|---|---|
| 2007/0141540 | A1* | 6/2007 | Borg | G06Q 30/02 |
| | | | | 434/127 |
| 2009/0258332 | A1* | 10/2009 | Do | G09B 21/003 |
| | | | | 434/127 |
| 2010/0057540 | A1* | 3/2010 | Tanaka | G06Q 20/203 |
| | | | | 705/15 |
| 2011/0289044 | A1* | 11/2011 | Harrison | G06F 19/3475 |
| | | | | 706/52 |
| 2014/0295822 | A1 | 10/2014 | Koo et al. | |
| 2014/0324607 | A1* | 10/2014 | Frehn | G06Q 50/12 |
| | | | | 705/15 |
| 2014/0344054 | A1* | 11/2014 | Maeda | G06Q 30/0255 |
| | | | | 705/14.53 |
| 2015/0290795 | A1* | 10/2015 | Oleynik | G05B 19/42 |
| | | | | 700/257 |
| 2016/0081515 | A1* | 3/2016 | Aboujassoum | A47J 36/00 |
| | | | | 426/231 |
| 2018/0330295 | A1* | 11/2018 | An | G06Q 10/06311 |

FOREIGN PATENT DOCUMENTS

| | | |
|---|---|---|
| JP | 2002207869 | 7/2002 |
| JP | 2002-288359 | 10/2002 |
| JP | 2002-310431 | 10/2002 |
| JP | 2003-307313 | 10/2003 |
| JP | 2004-220414 | 8/2004 |
| JP | 2009054042 | 3/2009 |
| JP | 2014-010716 | 1/2014 |
| JP | 2015052968 | 3/2015 |
| KR | 10-0878025 | 1/2009 |
| KR | 20130006876 | 1/2013 |
| KR | 10-1634628 | 6/2016 |

OTHER PUBLICATIONS

Japanese Office Action dated Feb. 26, 2019, issued in Japanese Patent Application No. 2017-174723.

* cited by examiner

METHOD AND SYSTEM FOR PROVIDING COOKING SUPPORT SERVICES

CROSS REFERENCE TO RELATED APPLICATION

This application claims priority from and the benefit of Korean Patent Application No. 10-2016-0120557, filed on Sep. 21, 2016, which is hereby incorporated by reference for all purposes as if fully set forth herein.

BACKGROUND

Field

Exemplary embodiments of the present invention relate to technology for providing a recipe for cooking food.

Discussion of the Background

Currently, a variety of information necessary for facilitating human living may be provided in the form of texts, voice, images, etc., through Internet services.

In general, if a user desires to cook an unfamiliar food, the user may acquire a recipe of the desired food through an Internet service and may cook the food while sequentially checking a cooking process included in the recipe.

As an example of technology for providing a recipe, Korean Patent Registration No. 10-0878025, registered on Jan. 5, 2009, discloses a system and method that may provide cooking information to a mobile terminal using a synchronized multimedia integration language (SMIL) message, of which contents sequentially vary over time.

The above information disclosed in this Background section is only for enhancement of understanding of the background of the inventive concepts. Therefore, it may contain information that does not form the prior art that was already known to a person of ordinary skill in the art or was publically available prior to an effective filing date of subject matter disclosed herein.

SUMMARY

Exemplary embodiments provide a method and system that may provide a recipe and specifications information of cookware included in the recipe.

Exemplary embodiments also provide a method and system that may provide a customized recipe quantified for cookware of a user.

Exemplary embodiments also provide a method and system that may provide a commercial recipe including recommendation information about a cooking material or cookware.

Exemplary embodiments also provide a method and system that may provide a preferred recipe to which a user preference or a user feedback is applied.

Exemplary embodiments also provide a method and system that may synchronize and control a user terminal or cookware based on a recipe.

Additional features of the invention will be set forth in the description which follows, and in part will be apparent from the description, or may be learned by practice of the invention.

An exemplary embodiment of the inventive concepts discloses a computer-implemented method including receiving a selection on a specific recipe from a user of an electronic device among recipes registered on a platform; and providing specifications information about each piece of cookware included in the specific recipe.

The method may further include updating the specific recipe with a customized recipe quantified for cookware selected or input from the user and providing the customized recipe.

The specific recipe may include a cooking time quantified for cookware included in the specific recipe, and the updating and the providing may include acquiring the customized recipe by inducing a cooking time suitable for specifications of the cookware selected or input from the user based on the cooking time and the specifications of the cookware that are included in the specific recipe.

The providing of the specifications information may include providing a user interface for changing at least one of the cookware included in the specific recipe.

The providing of the specifications information may include providing specifications information for each piece of cookware directly registered by an information provider that registers the recipe or providing specifications information for each piece of cookware retrieved from Internet information based on information about the cookware registered by the information provider.

The method may further include providing recommendation information about at least one of a recipe, a cooking material, and cookware to the user.

The providing of the recommendation information may include recommending at least one of a cooking material and cookware included in the specific recipe.

The providing of the recommendation information may include recommending a recipe that includes a cooking material or cookware in response to the cooking material or the cookware being specified by the user, or recommending another cooking material or cookware associated with the specified cooking material or cookware.

The method may further include analyzing a user preference by using at least one of a user purchase history associated with a cooking material or cookware, a user use history associated with a recipe, and a user feedback as user information associated with the user; and providing a preferred recipe to which the user preference is applied.

The providing of the preferred recipe may include acquiring the preferred recipe by updating the specific recipe based on at least one of a cooking material or cookware preferred by the user and a cooking time.

The method may further include guiding a cooking process included in the customized recipe, and synchronizing a cooking time of the cooking process included in the customized recipe with a timer of the electronic device.

The method may further include controlling cookware used for a cooking process included in the customized recipe through an automation device installed in a home of the user in conjunction with the automation device.

An exemplary embodiment of the inventive concepts also discloses a computer-implemented method including receiving information about a cooking material input from a user from an electronic device; and recommending at least one recipe to the user among recipes registered on a platform, based on the input cooking material.

An exemplary embodiment of the inventive concepts also discloses a computer-implemented system including at least one processor configured to execute a computer-readable instruction. The at least one processor is configured to provide specifications information about each piece of cookware included in a specific recipe in response to receiving a selection on the specific recipe from a user of an electronic device among recipes registered on a platform, and to update the specific recipe with a customized recipe quantified for cookware selected or input from the user and provide the customized recipe.

It is to be understood that both the foregoing general description and the following detailed description are exemplary and explanatory and are intended to provide further explanation of the invention as claimed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
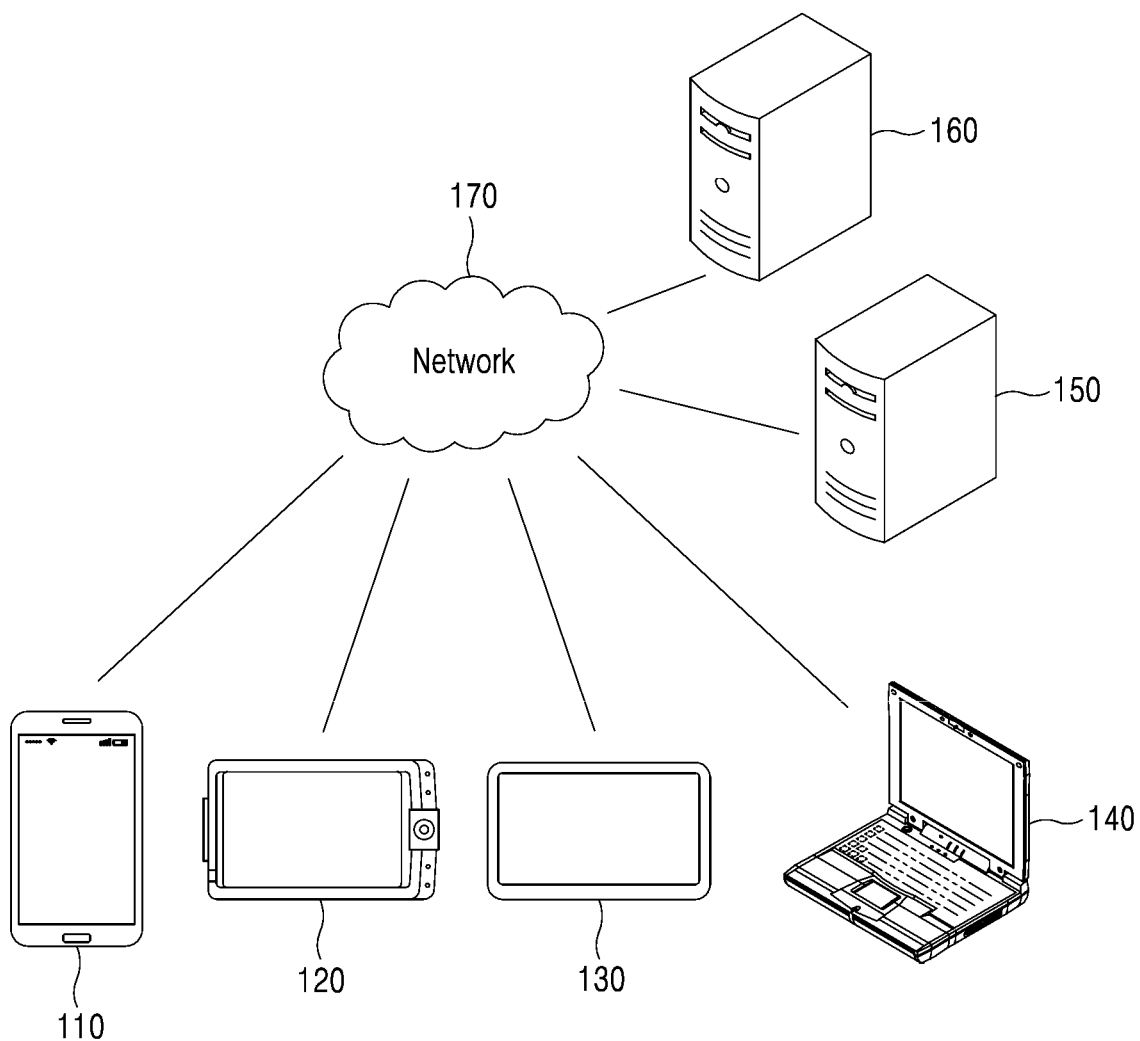
FIG. 1 illustrates an example of a network environment according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. When an exemplary embodiment may be implemented differently, a specific process order may be performed differently from the described order. For example, two consecutively described processes may be performed substantially at the same time or performed in an order opposite to the described order. Also, like reference numerals denote like elements.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments are described in detail with reference to the accompanying drawings.

The exemplary embodiments relate to technology for providing a recipe, and more particularly, to a method and system that may provide a recipe quantified for cookware and thereby provide a commercial service.

The exemplary embodiments disclosed herein may achieve recipe quantification and commercial conjunction and may also achieve advantages in terms of efficiency, convenience, cost saving, and the like.

FIG. 1 illustrates an example of a network environment according to exemplary embodiments. Referring to FIG. 1, the network environment includes a plurality of electronic devices 110, 120, 130, and 140, a plurality of servers 150 and 160, and a network 170. FIG. 1 is provided as an example only, and a number of electronic devices and/or a number of servers are not limited thereto.

Each of the electronic devices 110, 120, 130, and 140 may be a fixed terminal or a mobile terminal configured as a computer device. For example, the electronic devices 110, 120, 130, and 140 may be any of a smartphone, a mobile phone, navigation, a computer, a laptop computer, a digital broadcasting terminal, a personal digital assistant (PDA), a portable multimedia player (PMP), a tablet personal computer (PC), and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, these are only examples, and exemplary embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. Also, the electronic device 110 may connect to the server 150 under control of at least one program, for example, a browser or the application, and an operating system (OS) included in the electronic device 110, and may receive a service or content provided from the server 150. For example, in response to a service request message that is transmitted from the electronic device 110 to the server 150 over the network 170 under control of the application, the server 150 may transmit a code corresponding to the service request message to the electronic device 110. The electronic device 110 may provide the content to the user by configuring and displaying a screen corresponding to the code under control of the application.

Figure 2:
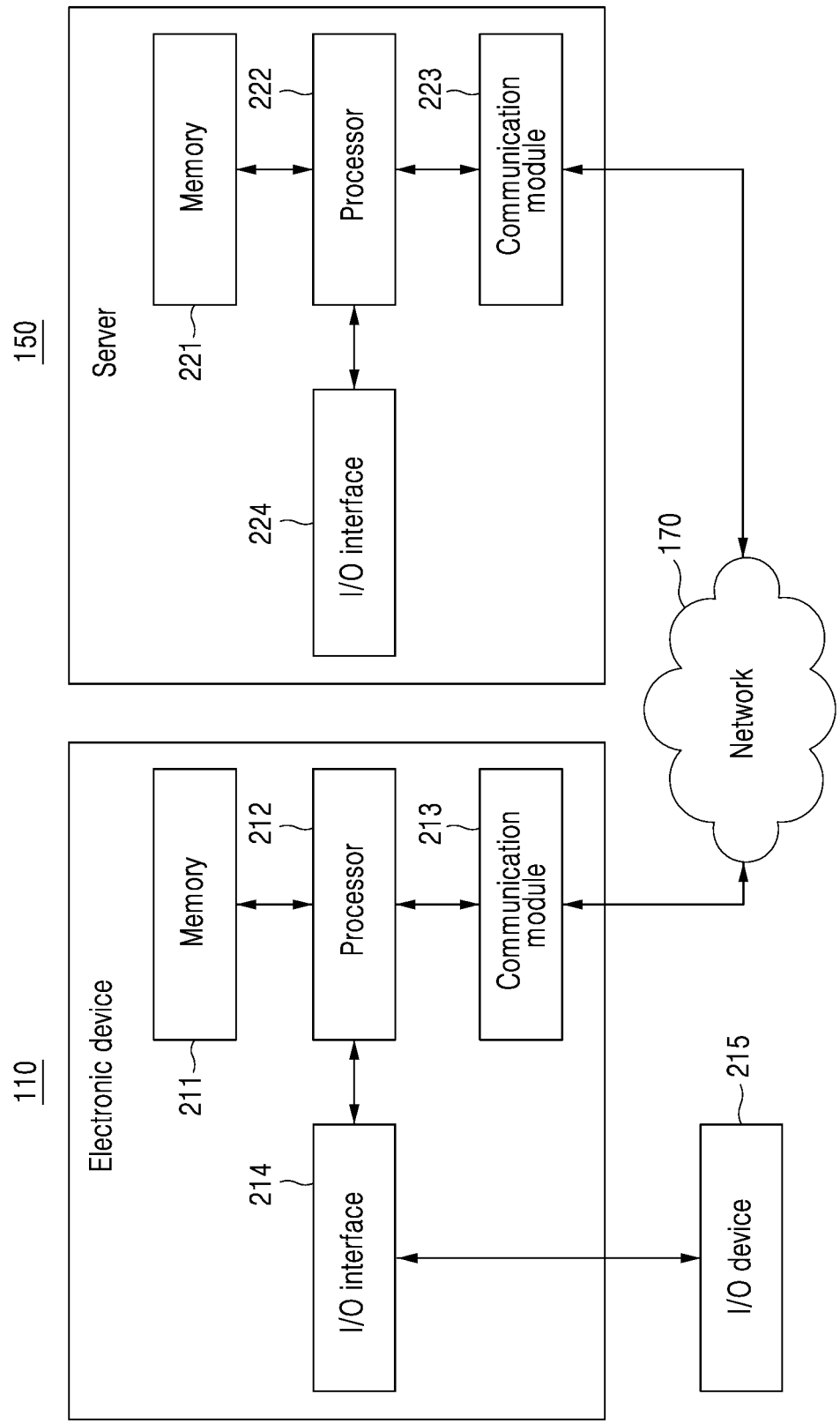
FIG. 2 illustrates an example of an electronic device and a server according to exemplary embodiments.

FIG. 2 illustrates an example of a configuration of an electronic device and a server according to exemplary embodiments. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Also, an OS and at least one program code, for example, a code for a browser or an application installed and executed on the electronic device 110, may be stored in the memory 211, 221. Such software components may be loaded from another computer-readable storage medium separate from the memory 211, 221. The other computer-readable storage medium may include, for example, a floppy drive, a disk, a tape, a DVD/CD-ROM drive, a memory card, etc. According to other exemplary embodiments, software components may be loaded to the memory 211, 221 through the communication module 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a recipe providing request, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214, 224 may be a device used for interfacing with an I/O device 215. For example, an input device may include a keyboard, a mouse, etc., and an output device may include a device, such as a display, for displaying a communication session of an application. As another example, the I/O interface 214 may be a device for interfacing with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other exemplary embodiments, the electronic device 110 and the server 150 may include a greater or lesser number of components than the number of components shown in FIG. 2. However, there is no need to clearly illustrate many components according to the related art. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a vibrator for vibration, etc., which are generally included in the smartphone.

Figure 3:
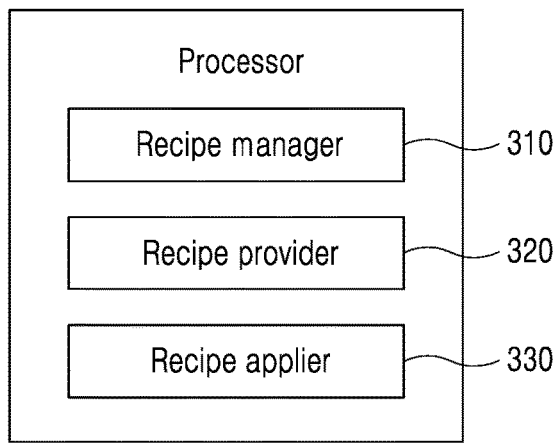
FIG. 3 illustrates an example of components includable in a processor of a server according to exemplary embodiments.
Figure 4:
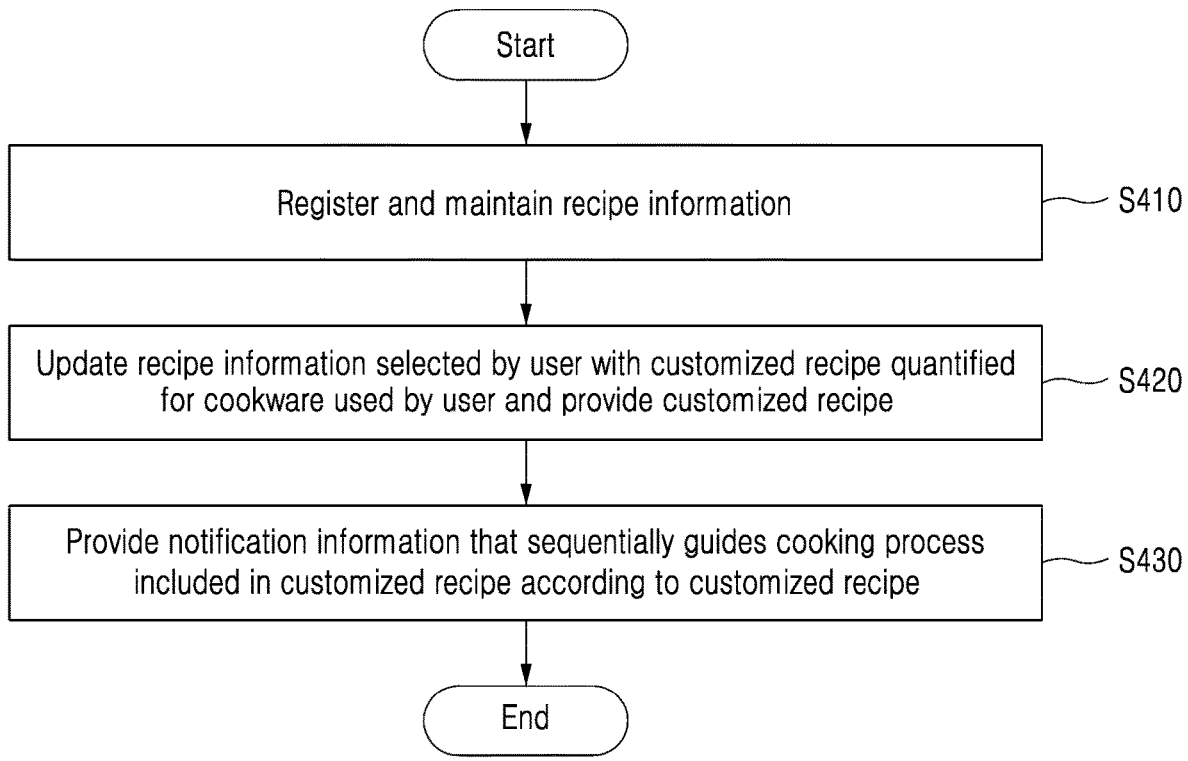
FIG. 4 is a flowchart illustrating an example of a method performed at a server according to exemplary embodiments.

FIG. 3 illustrates an example of components includable in a processor of a server according to exemplary embodiments, and FIG. 4 is a flowchart illustrating an example of a method performed by a server according to exemplary embodiments.

Referring to FIG. 3, the processor 222 of the server 150 may include a recipe manager 310, a recipe provider 320, and a recipe applier 330. The processor 222 and the components of the processor 222 may control the server 150 to perform operations S410 through S430 included in the method of FIG. 4. Here, the processor 222 and the components of the processor 222 may be configured to execute an instruction according to a code of at least one program and a code of the OS included in the memory 221. Also, the components of the processor 222 may be representations of different functions performed by the processor 222 in response to a control instruction provided from the OS or the application. For example, the recipe manager 310 may be used as a functional expression that the processor 222 registers and maintains recipe information in response to the control instruction.

In operation S410, the recipe manager 310 may register and maintain recipe information that includes overall information used for a cooking operation. The recipe manager 310 may receive and register recipe information from an information provider having a recipe registration right with respect to a plurality of foods. Here, at least one recipe may be registered for each food. The recipe information may include overall information about a cooking material and a cooking process that are used for corresponding cooking. In particular, the recipe information may include a list of cookware used for actual cooking and specifications of each piece of cookware as a recipe quantified for cookware. Here, the cookware may indicate any type of instruments used for cooking, and may include, for example, a gas stove, a microwave oven, an oven, a refrigerator, an aging fridge, an electric steamer, a mixer, a pot, a frying pan, and the like. The specifications of cookware may refer to specifications associated with a performance. For example, the specifications of the gas stove may include calories per fuel intake (kcal/h, kW), and the specifications of the pot may include a capacity, a thickness, a boiling time reach time, and the like. The recipe information may mainly include information about a cooking method and a cooking time. The cooking time may vary based on the specifications of cookware and thus, may include time information quantified for corresponding cookware. Information about the cooking time may include the specifications of corresponding cookware or information, for example, a model name, a serial number, etc., capable of specifying the corresponding specification, such as "heat for about 10 minutes if you cook at high heat using a pot of model B of R company and a gas stove of model A of L company L", "heat for 9 minutes if you cook at high heat with a pot of model D of H company and a gas stove of model C of S company", etc., and may be registered in a form of information quantified for the corresponding cookware.

The information provider may register the recipe information on a platform associated with the server 150. The recipe manager 310 may store the registered recipe information in a database (not shown) and may manage the stored recipe information. The specifications of cookware included in the recipe information may be directly input from the information provider. As another example, information capable of specifying the specifications of cookware may be registered using, for example, a model name, a serial number, and the like. In this case, the specifications may be acquired and registered by searching for the corresponding cookware from the Internet information. Here, the database may serve to store and maintain the recipe information under control of the recipe manager 310. Also, the database may be included as a component configured inside the server 150. Alternatively, the entire database or a portion of the database may be present as an external database constructed on a separate system.

The recipe manager 310 may register and maintain user information with respect to each of users using a recipe registered on a platform. Here, information about cookware of a user may be registered in advance and included in the user information. As another example, the user information may further include a user feedback (reaction) to a recipe used by the user, purchase details of cooking materials or cookware, a user preference, and the like. The recipe manager 310 may register and maintain the user feedback so that the feedback about the recipe registered on the platform may be shared between users. For example, the recipe manager 310 may register the user feedback, such as assessment for a recipe, assessment for materials or cookware associated with the recipe with respect to each of the recipes registered on the platform.

In operation S420, the recipe provider 320 may provide recipe information selected by a user of the electronic device 110 from recipe information registered on a recipe platform to the electronic device 110. Here, the recipe provider 320 may update the selected recipe information with a customized recipe quantified for cookware used by the user and may provide the customized recipe. In general, due to measuring issues and a failure in standardization of cookware, it is not easy to actually cook according to an existing recipe. The recipe provider 320 may provide the specifications for each piece of cookware and information about basic cookware used for a corresponding recipe to make cooking easy and to reduce a trial-and-error probability. Accordingly, the user may compare specifications between cookware included in a recipe and cookware that the user is to use, and may verify the specifications. The recipe provider 320 may register information about actual cookware used by the user of the electronic device 110 and may provide a customized recipe quantified for the corresponding cookware. For example, the recipe provider 320 may quantify a corresponding recipe by updating a cooking time using basic cookware included in the recipe with a cooking time suitable for the specifications of cookware used by the user.

The recipe provider 320 may provide a commercial recipe that includes recommendation information about a cooking material or cookware. The server 150 may recommend and sell a material and cookware used for a cooking by associating the recipe platform with a commercial. For example, the recipe provider 320 may provide cookware included in a recipe or another cookware that matches or is similar to the specifications of the cookware as recommendation information. Here, the recipe provider 320 may provide other products based on products maintained by the user. As another example, the recipe provider 320 may recommend a recipe associated with materials purchased or maintained by the user. Here, the recipe provider 320 may also recommend an additional material or cookware. As another example, the recipe provider 320 may receive a cooking material that the user maintains or desire to purchase through various input paths from the user, and in response to an input of information about a cooking material separate from the cookware, may recommend at least one recipe using the cooking material input from the user among recipes registered on the platform.

Also, the recipe provider 320 may provide a preferred recipe to which purchase details of the user or a user preference to the cooking material or the cookware and a user feedback (reaction) to the recipe are applied. For example, the recipe provider 320 may recommend a recipe associated with a material purchased or maintained by the user. As another example, the recipe provider 320 may recommend a recipe that includes a material frequently used by the user, that is, a preferred material or cookware. As another example, the recipe provider 320 may recommend a recipe to which a user feedback to the recipe is applied. For example, if the user requests an adjustment of a basic cooking time included in a recipe, and if the user desires to use the same recipe or to use a similar recipe, the recipe provider 320 may provide a recipe that is updated with the time requested by the user.

In operation S430, the recipe applier 330 may provide notification information that sequentially guides a cooking process of the recipe according to the recipe provided to the user of the electronic device 110. For example, in response to receiving a cooking start intent from the user of the electronic device 110, the recipe applier 330 may activate a timer through a browser or a dedicated application installed on the electronic device 110 and may inform a cooking time of the cooking process through the timer, and may notify the user how to use, add, and remove a material of the cooking process using a video, voice, and the like.

Further, the recipe applier 330 may control at least one device among devices associated with the user according to the recipe provided to the user of the electronic device 110. For example, the server 150 may synchronize a cooking time of a cooking process included in a recipe with the timer of the electronic device 110 in conjunction with the electronic device 110 on which the dedicated application is installed. As another example, the server 150 may control cookware used for each process through an automation device installed in a home of the user of the electronic device 110 according to the cooking process included in the recipe in conjunction with the automation device. The automation device may be, for example, a home robot, a home Internet of things (IoT), and the like.

Figure 5:
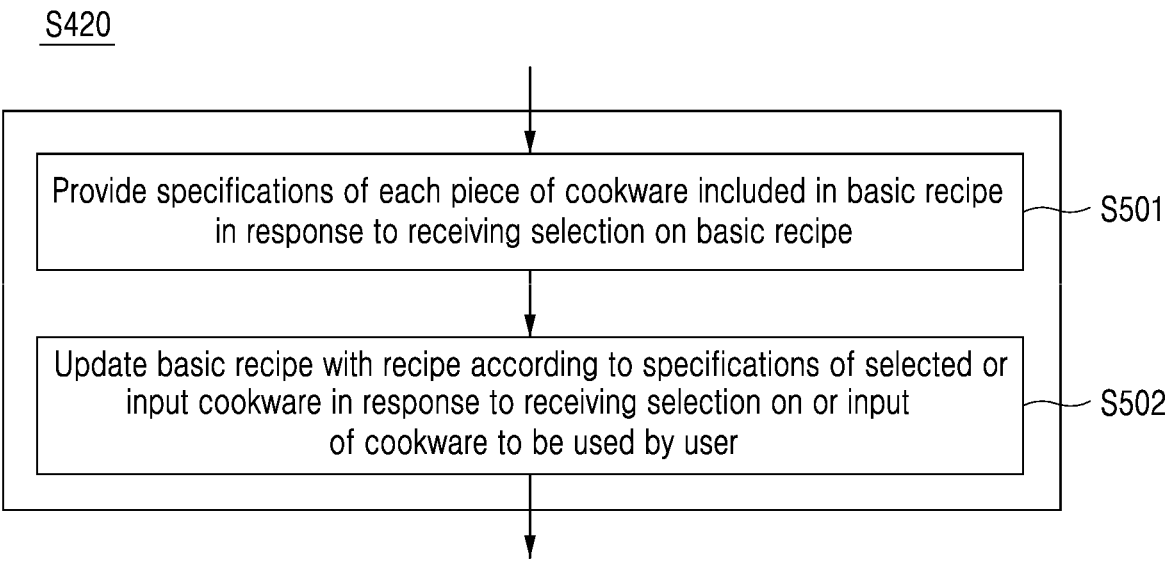
FIG. 5 is a flowchart illustrating an example of a process of providing a customized recipe according to exemplary embodiments.

FIG. 5 is a flowchart illustrating an example of a process of providing a customized recipe according to exemplary embodiments. The customized recipe providing process of FIG. 5 may be included in operation S420 of FIG. 4.

Referring to FIG. 5, in operation S501, the recipe provider 320 may provide specifications of each piece of cookware included in a basic recipe in response to receiving a selection on the basic recipe from the user of the electronic device 110. The basic recipe may indicate an initial recipe registered by an information provider, and may be a recipe retrieved by the user or a recipe recommended by the server 150 to the user through various recommendation logics. The recipe provider 320 may provide a list of cookware actually used for the recipe by the information provider and specifications of each piece of cookware to a user that selects the corresponding recipe.

In operation S502, the recipe provider 320 may update the basic recipe with a recipe according to specifications of cookware in response to receiving a selection on or an input of the cookware to be actually used by the user. The recipe provider 320 may provide a user interface for changing corresponding cookware with an instrument, that is, cookware to be actually used by the user with respect to each piece of cookware included in the basic recipe or a user interface for integrally changing the entire cookware included in the basic recipe with instruments to be actually used by the user. The cookware that is actually used by the user may be read from pre-registered information and applied, or may be newly selected or input and applied at a point in time at which a customized recipe is requested. The recipe provider 320 may provide a cookware search environment so that the user may select or input an instrument used by the user through a search. For example, the recipe provider 320 may acquire a recipe quantified for cookware used by the user by inducing or inferring a cooking time suitable for specifications of the cookware used by the user based on a cooking time and specifications of cookware that are included in the basic recipe. Here, recipe quantification may be configured using a learning model for a cooking time and specifications of cookware or using a simple calculation such as a proportional expression.

According to exemplary embodiments, since a recipe may be quantified to be suitable for specifications information of cookware actually used by a user, it is possible to make cooking easy and to reduce a trial-and-error probability on a user side.

Figure 6:
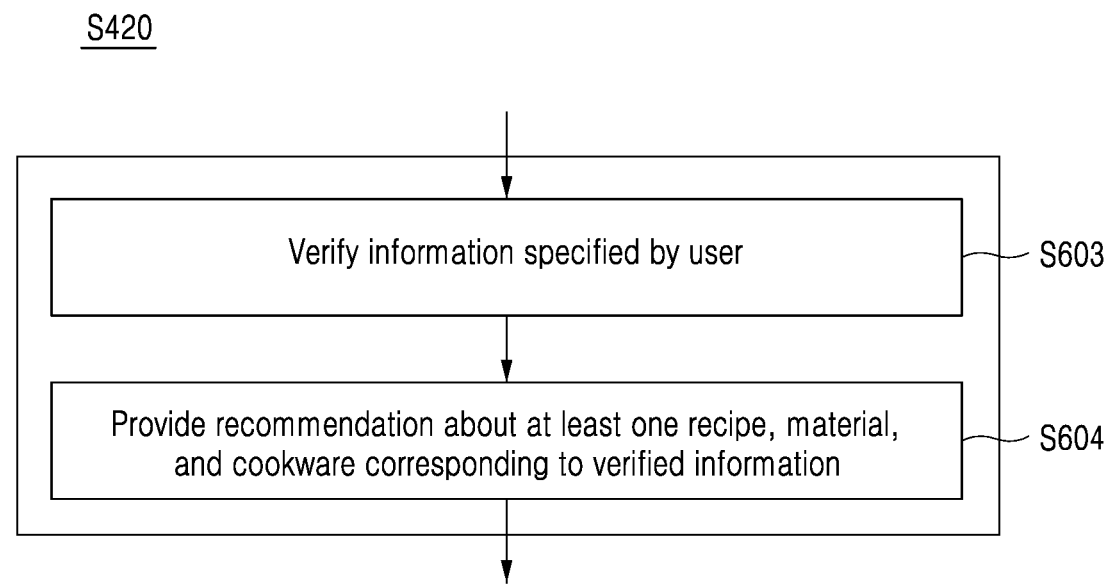
FIG. 6 is a flowchart illustrating an example of a process of providing a commercial recipe according to exemplary embodiments.

FIG. 6 is a flowchart illustrating an example of a process of providing a commercial recipe according to exemplary embodiments. The commercial recipe providing process of FIG. 6 may be further included in operation S420 of FIG. 4.

Referring to FIG. 6, in operation S603, the recipe provider 320 may verify information specified by the user of the electronic device 110. For example, the specified information may include information about a recipe selected by the user. As another example, the specified information may include information about materials or cookware purchased or maintained by the user.

In operation S604, the recipe provider 320 may provide recommendation information about at least one of a recipe, a material, and cookware corresponding to information specified by the user of the electronic device 110. For example, in response to receiving a selection from the user on a specific recipe, the recipe provider 320 may introduce and recommend at least one of materials and cookware included in the corresponding recipe. Here, in addition to the cookware included in the recipe, the recipe provider 320 may recommend similar products, subordinated products, and the like through cookware quantification. As another example, in response to a purchase of the user on a specific material or cookware, the recipe provider 320 may recommend a recipe that includes the corresponding material or cookware, or may recommend another material or cookware associated with the material or cookware purchased by the user.

According to exemplary embodiments, since materials or cookware used for a cooking may be collected as a commercial condition, it is possible to recommend a material or cookware suitable for a recipe of the cooking in association with such a commercial.

Figure 7:
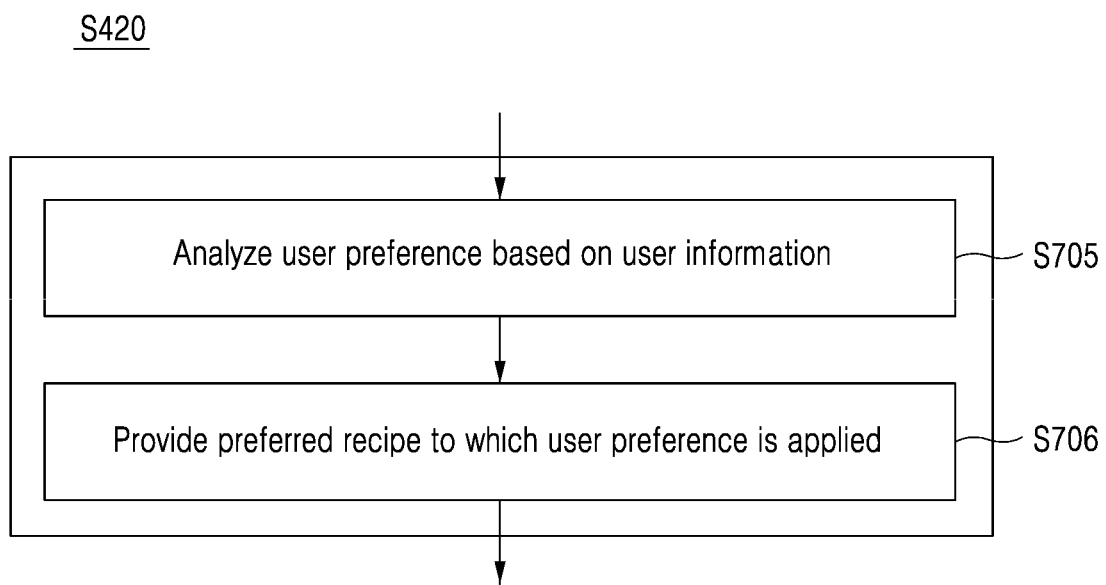
FIG. 7 is a flowchart illustrating an example of a process of providing a preferred recipe according to exemplary embodiments.

FIG. 7 is a flowchart illustrating an example of a process of providing a preferred recipe according to exemplary embodiments. The preferred recipe providing process of FIG. 7 may be further included in operation S420 of FIG. 4.

Referring to FIG. 7, in operation S705, the recipe provider 320 may analyze a user preference based on user information. For example, the recipe provider 320 may analyze a user preference, for example, a material or cookware frequently used by the user, based on a user purchase history associated with a material or cookware or a user use history associated with a recipe. As another example, the recipe provider 320 may collect a user feedback for a recipe used by the user and may analyze a user preference. For example, the recipe provider 320 may provide a user interface that allows the user to change a material, cookware, a cooking time, etc., which are included in a basic recipe. Using the user interface, the user may exchange material A of the basic recipe with material B, and may change the cooking time from 10 minutes to 8 minutes. The recipe provider 320 may analyze the user preference with respect to a material, cookware, a cooking state, etc., frequently used by the user, based on the user feedback for the basic recipe.

In operation S706, the recipe provider 320 may provide a preferred recipe to which the user preference is applied. For example, when providing a basic recipe registered on a platform to the user through a search logic, a recommendation logic, and the like, the recipe provider 320 may update the basic recipe with the preferred recipe to which the user preference is applied and may provide the preferred recipe. That is, the recipe provider 320 may update and provide a recipe suitable for a material, cookware, a cooking state, etc., frequently used by the user. For example, with respect to a basic recipe using squid, a user request for changing squid with shrimp may be transferred. Also, with respect to a basic recipe including a process of cooking meat 100 g for 7 minutes on a heated frying pan, a cooking time may be changed from 7 minutes to 5 minutes based on a degree of meat baking preferred by the user. When providing a recipe that includes the same material or the same cooking process to the user, to the recipe provider 320 may provide a recipe that includes a replaced material or cooking time preferred by the user based on the user feedback.

According to exemplary embodiments, it is possible to analyze a user preference based on a user purchase history associated with a material or cookware, a user use history associated with a recipe, and/or a user feedback, and to apply the user preference to at least one of a material or cookware and a cooking process included in the recipe.

According to exemplary embodiments, it is possible to provide a recipe and specifications information of cookware included in the recipe.

Also, according to exemplary embodiments, it is possible to provide a customized recipe quantified for cookware of a user.

Also, according to exemplary embodiments, it is possible to provide a commercial recipe including recommendation information about a cooking material or cookware.

Also, according to exemplary embodiments, it is possible to provide a preferred recipe to which a user preference or a user feedback is applied.

Also, according to exemplary embodiments, it is possible to synchronize and control a user terminal or cookware based on a recipe.

The apparatuses described herein may be implemented using hardware components, software components, and/or a combination thereof. For example, the apparatuses and components described in the exemplary embodiments may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A computer-implemented method comprising:
   receiving a selection on a specific recipe from a user of an electronic device among recipes registered on a platform;
   providing specifications information of each piece of cookware included in the specific recipe, the specifications information being associated with a performance of each piece of cookware, wherein the providing of the specifications information comprises providing a user interface for changing at least one of the cookware included in the specific recipe, and the user interface provides a cookware search environment allowing the user to select or input cookware to be changed by searching for the cookware to be changed through the cookware search environment;
   first updating the specific recipe based on specifications information of changed cookware input by the user through the user interface;

analyzing a user preference by using user purchase history associated with a cooking material and cookware as user information associated with the user;

second updating the first updated specific recipe as a preferred recipe based on the user preference; and providing the preferred recipe to which the user preference is applied, wherein the second updating comprises replacing cooking material included in the first updated specific recipe with cooking material associated with the user preference.

2. The method of claim 1, wherein:

the specific recipe comprises a cooking time quantified for cookware included in the specific recipe; and the first updating comprises inducing a cooking time suitable for specifications information of the cookware selected or input from the user through the user interface based on the cooking time and the specifications information of the cookware that are included in the specific recipe.

3. The method of claim 1, wherein the providing of the specifications information comprises providing specifications information for each piece of cookware directly registered by an information provider that registers the recipe or providing specifications information for each piece of cookware retrieved from Internet information based on information about the cookware registered by the information provider.

4. The method of claim 1, further comprising providing recommendation information about at least one of a recipe, a cooking material, and cookware to the user.

5. The method of claim 4, wherein the providing of the recommendation information comprises recommending at least one of a cooking material and cookware included in the specific recipe.

6. The method of claim 4, wherein the providing of the recommendation information comprises recommending a recipe that includes a cooking material or cookware in response to the cooking material or the cookware being specified by the user, or recommending another cooking material or cookware associated with the specified cooking material or cookware.

7. The method of claim 1, further comprising guiding a cooking process included in the customized recipe, and synchronizing a cooking time of the cooking process included in the customized recipe with a timer of the electronic device.

8. The method of claim 1, further comprising controlling cookware used for a cooking process included in the customized recipe through an automation device installed in a home of the user.

* * * * *